United States Patent
Ishii et al.

(10) Patent No.: US 8,942,754 B2
(45) Date of Patent: Jan. 27, 2015

(54) DEVICES FOR ALLOCATING POWER FOR UPLINK TRANSMISSION

(75) Inventors: Atsushi Ishii, Vancouver, WA (US); Louis Joseph Kerofsky, Camas, WA (US); Sachin G. Deshpande, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 343 days.

(21) Appl. No.: 13/569,074

(22) Filed: Aug. 7, 2012

(65) Prior Publication Data

US 2014/0045543 A1 Feb. 13, 2014

(51) Int. Cl.
*H04W 52/04* (2009.01)
*H04W 24/10* (2009.01)

(52) U.S. Cl.
USPC ........ 455/522; 455/127.5; 455/574; 370/328; 370/329

(58) Field of Classification Search
CPC . H04W 52/146; H04W 52/34; H04W 52/365; H04W 52/367; H04W 52/04; H04W 24/10; Y02B 60/50; H04L 5/001; H04L 5/0037
USPC .......................... 455/522, 574, 127.5, 67.11, 455/343.1–343.5, 464, 509; 370/329–338, 370/250–252
See application file for complete search history.

(56) References Cited

U.S. PATENT DOCUMENTS

| | | | |
|---|---|---|---|
| 6,119,023 A | 9/2000 | Tomiyori | |
| 7,663,597 B2 | 2/2010 | Plut | |
| 8,315,661 B2 * | 11/2012 | Zong | 455/522 |
| 8,594,718 B2 * | 11/2013 | Yang et al. | 455/522 |
| 8,737,333 B2 * | 5/2014 | Chen et al. | 370/329 |
| 2008/0161071 A1 | 7/2008 | Sherman | |
| 2010/0053222 A1 | 3/2010 | Kerofsky | |
| 2012/0087317 A1 * | 4/2012 | Bostrom et al. | 370/329 |
| 2012/0106477 A1 * | 5/2012 | Kwon et al. | 370/329 |
| 2012/0113919 A1 * | 5/2012 | Kone | 370/329 |
| 2012/0224535 A1 * | 9/2012 | Kim et al. | 370/328 |
| 2013/0039202 A1 * | 2/2013 | Feuersanger et al. | 370/252 |
| 2013/0188570 A1 * | 7/2013 | Zhao et al. | 370/329 |
| 2013/0215824 A1 * | 8/2013 | Wang et al. | 370/328 |

OTHER PUBLICATIONS

U.S. Appl. No. 13/084,424, filed Apr. 11, 2011, Deshpande, et al.

* cited by examiner

*Primary Examiner* — Pablo Tran
(74) *Attorney, Agent, or Firm* — Austin Rapp & Hardman

(57) ABSTRACT

A User Equipment (UE) for allocating power for uplink transmission to an evolved Node B (eNB) is described. The UE includes a processor and memory that is in electronic communication with the processor. Executable instructions are stored in the memory. The UE obtains a power headroom. The UE also obtains a threshold. Also, the UE reduces power consumption if the power headroom is less than the threshold. The power headroom is based on the difference between a maximum uplink transmit power and an estimated uplink transmit power.

20 Claims, 11 Drawing Sheets

DEVICES FOR ALLOCATING POWER FOR UPLINK TRANSMISSION

TECHNICAL FIELD

The present disclosure relates generally to communication systems. More specifically, the present disclosure relates to devices for allocating power for uplink transmission.

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may communicate with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices are equipped with many components that consume power. If active simultaneously, these components may reduce the power available for uplink transmission. This may result in a drop of the amount of data that may be transmitted, or the rate of data transmission. As illustrated in this discussion, systems and methods that manage uplink transmission power may be beneficial.

DETAILED DESCRIPTION

Figure 1:
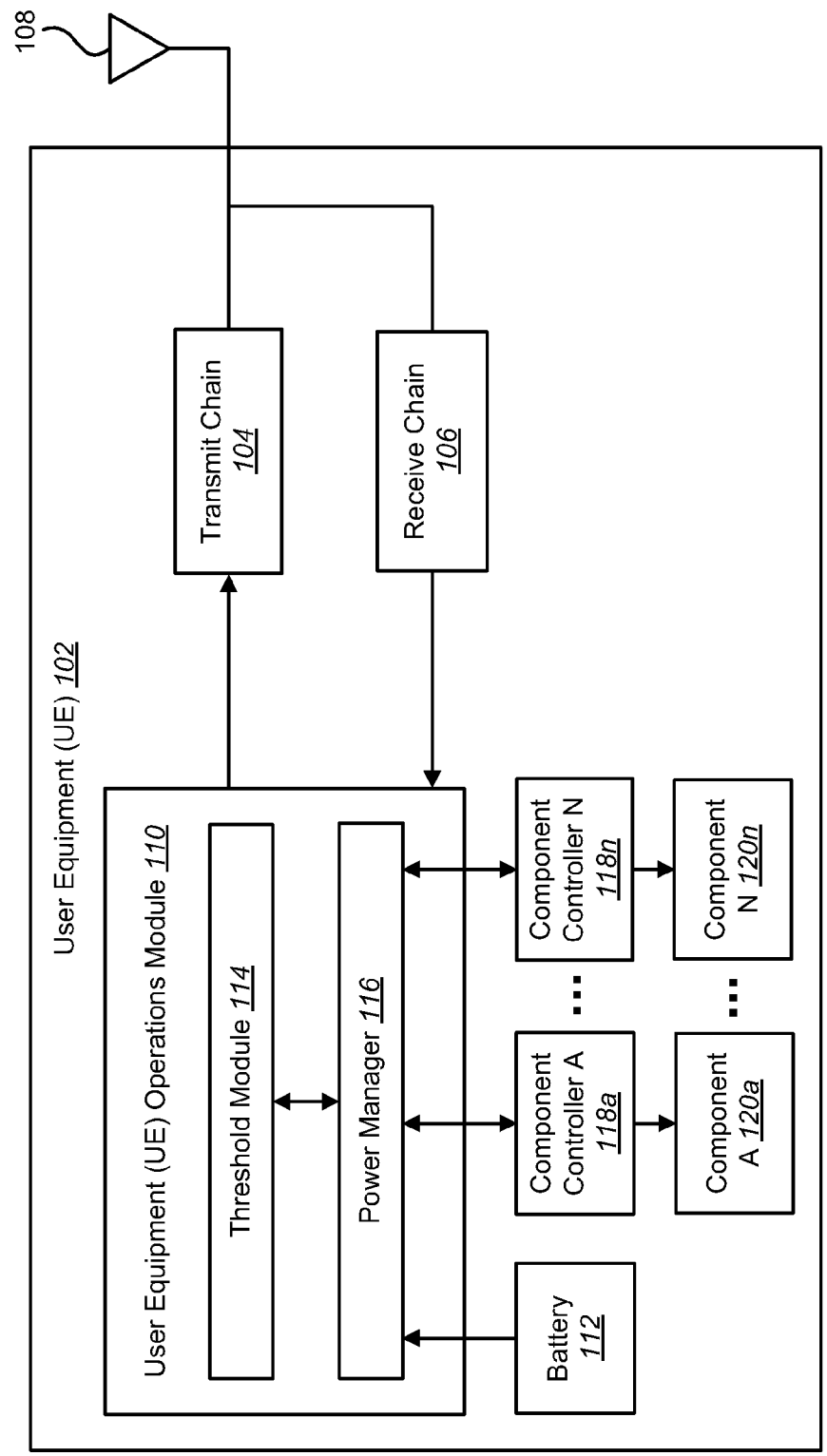
FIG. 1 is a block diagram illustrating one configuration of a User Equipment (UE) in which systems and methods for allocating power for uplink transmission may be implemented.

A UE for allocating power for uplink transmission to an eNB is described. The UE includes a processor and memory in electronic communication with the processor. Executable instructions are stored in the memory. The UE obtains a power headroom. The power headroom is based on a difference between a maximum uplink transmit power and an estimated uplink transmit power. The UE also obtains a threshold and reduces power consumption if the power headroom is less than the threshold.

Reducing power consumption may include reducing power consumption of at least one component. The component may be a liquid crystal display (LCD). The component may be a central processing unit (CPU).

The UE may perform an uplink transmission based on the estimated uplink transmit power if the power headroom is greater than the threshold. Reducing power consumption may be based on a difference between the power headroom and the threshold. Reducing power consumption may be based on discrete power consumption levels.

The estimated uplink transmit power may be based on an uplink resource. The maximum uplink transmit power may be based on a component power consumption. The UE may also send a power headroom report.

A method for allocating power by a UE for uplink transmission to an eNB is also described. The method includes obtaining a power headroom. The power headroom is based on a difference between a maximum uplink transmit power and an estimated uplink transmit power. The method further includes obtaining a threshold and reducing power consumption if the power headroom is less than the threshold.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A), 3rd Generation Partnership Project 2 (3GPP2) and other standards. However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an eNB, a home eNB (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

The systems and methods disclosed herein describe a UE for allocating power for uplink transmission. In some approaches, while preparing for uplink transmission over an LTE network, the UE (e.g., mobile station) may periodically send a power headroom report to an eNB (e.g., base station). The term "power headroom" refers to a difference between the maximum uplink transmit power and the estimated uplink transmit power for the current transmission. In other words, the power headroom report may indicate how much extra transmit power the UE is capable of generating on top of the current transmission. For example, when the UE has data ready to transmit, it may send a scheduling request that requests uplink resources. Upon receiving the scheduling request, the eNB may take into account the reported power headroom to determine the allocation of the uplink resources (e.g., time slots, sub-carriers, data rate and transmit power) to the UE.

Since the maximum uplink transmit power is the power that the UE can allocate for LTE transmission, it may change from time to time. In some approaches, the maximum uplink transmit power may be affected by the power consumption of UE components. For example, as a component consumes more UE power, the maximum uplink transmit power will be reduced.

In some cases, UEs, such as smart phones and tablets, may be equipped with many components that consume power, including, but not limited to, third generation (3G) cellular radio, fourth generation (4G) LTE cellular radio, Wi-Fi (e.g., Institute of Electrical and Electronics Engineers (IEEE) 802.11) radio, Worldwide Interoperability for Microwave Access (WiMAX) (e.g., Institute of Electrical and Electronics Engineers (IEEE) 802.16) radio, Bluetooth, LCDs and LCD backlights. In some cases, these components may be active simultaneously. In this case, a UE's overall power budget may be insufficient for LTE transmission. Thus, the maximum uplink transmit power may drop. In other words, as a component consumes power, the available power for LTE transmission is reduced. As a result, a UE may report lower, and possibly negative, power headroom to the eNB. This may result in the eNB reducing the uplink data rate. The eNB may also tear down the air link connection due to insufficient power.

In some examples, the power headroom is increased by reducing component power consumption. For example, an LCD and its backlights are among the most power-consuming components in the UE. A UE may reduce LCD power consumption by reducing the backlight power consumption in preparation for uplink transmission.

In some implementations, a power manager may supply power to UE components. The power manager may also monitor the power consumed by the components. Examples of UE components include displays (e.g., LCD screens), backlights, 3G radio, WiMAX radio, Wi-Fi radio, Bluetooth radio, sensors and processors. The UE total power budget may be illustrated by Equation (1).

$$P_{total}(t) \geq E(P_{ULact}(t)) + P_{LCD}(t) + P_{ComponentA}(t) + \ldots + P_{ComponentN}(t) \quad (1)$$

In Equation (1), $P_{total}(t)$ is the total UE power at time t. $P_{ULact}(t)$ is the actual uplink transmit power at time t. $P_{LCD}(t)$ is the power consumption of an LCD component at time t. $P_{ComponentA}(t)$ is the power consumption of component A at time t. $P_{ComponentN}(t)$ is the power consumption of component N at time t. In Equation (1), E(P) is a pre-determined function for transmitter power efficiency. For example, E(P) specifies the transmitter power efficiency to convert the radio transmission power to the battery power necessary to produce the radio transmission power. This is because a transmitter may not convert 100% of power provided (by a battery, for example) to transmit power.

In some approaches, the power headroom may be calculated in accordance with Equation (2).

$$P_{PH}(t) = P_{CMAX}(t) - P_{ULest}(t) \quad (2)$$

In Equation (2), $P_{PH}(t)$ is the power headroom at time t. $P_{CMAX}(t)$ is the maximum uplink transmit power at time t. $P_{ULest}(t)$ is an estimated uplink transmit power at time t. $P_{ULest}(t)$ may be based on the uplink resource allocated by the eNB. $P_{ULest}(t)$ may be larger if the UE requests a higher data rate.

$P_{CMAX}(t)$ may be calculated in accordance with Equation (3).

$$P_{CMAX}(t) = e(P_{total}(t) - \{P_{LCD}(t) + P_{ComponentA}(t) + \ldots + P_{ComponentN}(t) - P_{margin}\}) \quad (3)$$

In Equation (3), $P_{margin}$ is a predetermined constant value. In Equation (3), e(P) is the inverse function of E(P) described earlier, converting from available power to radio transmission power. In Equation (3), for example, e(P) may convert from the power available for uplink transmission (from a battery, for example) to the maximum uplink transmit power. While, $P_{ULact}(t)$ may change based on the UE uplink power control scheme, it may be upper-bounded by the maximum uplink transmit power. As a result, $P_{ULact}(t)$ may be less than or equal to $P_{CMAX}(t)$ as illustrated by Equation (4).

$$P_{ULact}(t) \leq P_{CMAX}(t) \quad (4)$$

Returning to Equation (2), $P_{PH}(t)$ may decrease when $P_{CMAX}(t)$ decreases, when $P_{ULest}(t)$ increases or a combination of both. In other words, the power headroom may be decreased when the UE is assigned a higher transmit power to achieve the desired data rate, when the other UE components consume more power or a combination of both. When $P_{PH}(t)$ is positive, the UE may still transmit at the estimated uplink transmit power $P_{ULest}(t)$. Thus, if $P_{ULact}(t) = P_{ULest}(t)$, there is sufficient power for uplink transmission. When $P_{PH}(t)$ becomes negative (e.g., $P_{ULact}(t) < P_{ULest}(t)$), the actual uplink transmit power may be insufficient given the current UE resource allocation. In this case, the UE may report negative power headroom or positive but close to zero-power headroom. As a result, the eNB may assign the UE a reduced uplink data rate. In addition to reducing the uplink data rate, a negative (or close to zero) power headroom may cause the air link to drop, especially in weak coverage areas.

According to some implementations, a power saving scheme of the UE components may increase the power headroom. For example, a UE may reduce the backlight power of an LCD while minimizing image quality degradation. To reduce power consumption of a UE component, a power manager may identify when the power headroom becomes less than a pre-determined threshold as illustrated by Equation (5).

$$P_{PH}(t) < P_{thres} \quad (5)$$

In Equation (5), $P_{thres}$ is the threshold amount. In this case, if the power headroom is less than the threshold, the power manager may direct one or more UE components to reduce power consumption. For example, the power manager may direct an LCD controller to reduce power consumption for the LCD backlight. In some cases, the power reduction requested by the power manager may be illustrated in accordance with Equation (6).

$$\Delta P_{T\_Component}(t) = \min[\Delta P_{Max\_Component}, E(P_{thres} - P_{PH}(t))] \quad (6)$$

In Equation (6), $\Delta P_{T\_Component1}(t)$ is an actual component power reduction. $\Delta P_{Max\_Component}$ is a maximum component power reduction. In some cases, this may be a pre-determined constant. Thus, the UE may direct the component controller to reduce power consumption by the lesser of the maximum component power reduction and the difference between the threshold and the power headroom.

In an example, the UE may increase the power headroom by reducing the LCD power consumption by the lesser of the LCD maximum power reduction and the difference between the threshold and the power headroom. For instance, the power manager may reduce the LCD power consumption by reducing the LCD refresh rate. The direction from the power manager may be based on a power need for uplink transmission.

In some examples, a component may have a set of discrete power saving levels and the component controller may elect one of the levels based on the power reduction directed by the power manager. In some cases, the LCD may have a set of discrete refresh rates. Each refresh rate may result in different power consumption. Thus, the LCD controller may select a refresh rate based on the power reduction request from the power manager.

In another example, the component is a CPU. In this example, the power manager may reduce the CPU power consumption. For example, the overall power consumed by a CPU may include dynamic power. The dynamic power, P, is related to the frequency, f, and voltage, V, as illustrated by Equation (7).

$$P = K \times f \times V^2 \quad (7)$$

In Equation (7), K is a constant. The CPU controller may select the CPU frequency, f, and voltage, V, based on the power manager's power reduction request. The selection may also be based on the current load of the CPU.

In another example, the UE may direct multiple components to reduce power consumption. For example, a UE may direct an LCD controller to reduce LCD backlight power and LCD refresh rate. In this example, the UE may also direct a CPU controller to reduce the CPU frequency and voltage.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a UE 102 in which systems and methods for allocating power for uplink transmission may be implemented. Examples of UEs 102 include cellular phones, smart phones, personal digital assistants (PDAs), laptop computers, netbooks, e-readers, wireless modems, etc.

In some implementations, the UE 102 may include one or more of a UE operations module 110, a battery 112, components 120a-n, component controllers 118a-n, a transmit chain 104, a receive chain 106 and one or more antennas 108. As used herein, the term "module" may indicate that a particular element or component may be implemented in hardware, software, firmware or a combination thereof. For example, the UE operations module 110 may be implemented in hardware (e.g., circuitry), software (e.g., instructions that are executable by a processor) or a combination of both.

The transmit chain 104 may prepare signals (e.g., data and control information) for transmission. For example, the transmit chain 104 may prepare control information supplied by the UE operations module 110 and provide it to one or more antennas 108 for transmission. The transmit chain 104 may include one or more modules that enable the UE 102 to transmit signals (e.g., data and control information). In some implementations, for example, the transmit chain 104 may include one or more encoders, one or more scrambling modules, one or more modulation mappers, one or more interleavers, a layer mapper, a pre-coding module, one or more resource element mappers and one or more Orthogonal Frequency-Division Multiplexing (OFDM) signal generation modules.

For instance, the transmit chain 104 may format and transmit signals that include data and control information. For example, the transmit chain 104 may scramble, encode, interleave, modulate, map (to spatial streams or layers), precode, upconvert, filter and amplify (or otherwise format) data and control information for transmission. It should be noted that multiple transmit chains 104 may be included in the UE 102 in some configurations. The one or more transmit chains 104 may support cellular (e.g., LTE) communications and satellite communications.

The receive chain 106 may receive signals from the one or more antennas 108. For example, the receive chain 106 may receive, detect and de-format data and control information from the one or more antennas 108. The receive chain 106 may include one or more modules that enable the UE 102 to receive signals (e.g., data and control information). In some implementations, for example, the receive chain 106 may include a receive signal detector, one or more demodulators, one or more decoders, one or more deinterleavers and one or more descramblers.

For instance, the receive chain 106 may receive and de-format signals that include data and control information. The receive chain 106 may amplify, downconvert, detect, demodulate, decode, filter and descramble (or otherwise de-format) received signals to produce received data and control information. Received control information may be provided to the UE operations module 110. It should be noted that multiple receive chains 106 may be included in the UE 102 in some configurations. The one or more receive chains 106 may support cellular (e.g., LTE) communications and satellite communications.

The UE operations module 110 may enable the UE 102 to allocate power for uplink transmission. For example, the UE 102 may include a battery 112. Examples of a battery 112 include, but are not limited to, an alkaline battery, a lithium-ion (Li-Ion) battery, a nickel-cadmium (NiCd) battery, a lithium polymer (Li-Poly) battery and a nickel metal hydride (NiMH) battery. In some implementations, the battery 112 may supply power to the UE 102. More particularly, the battery 112 may supply power to the components 120*a-n*. The total power supplied by the battery 112 may be illustrated by Equation (1). As illustrated in Equation (1), the power that the components 120*a-n* consume may limit the power that the battery 112 can supply for uplink transmission. In some implementations, the amount of power that the battery 112 can supply may vary. For example, if fewer components 120*a-n* are active, the battery 112 may supply more power to the active components 120*a-n*. In some implementations, the power supplied by the battery 112 may depend on the type of battery 112 used.

A power manager 116 coupled to the battery 112 may receive power supplied by the battery 112. In some configurations, the power manager 116 may be included in the UE operations module 110 (as illustrated). In other configurations, the power manager 116 may be separate from the UE operations module 110. For example, the power manager 116 may be a separate chip in some configurations. The power manager 116 may disperse the power supplied by the battery 112 to the UE 102 (e.g., to the components 120*a-n*). In some implementations, the power manager 116 may monitor the power consumption by the UE 102 and the components 120*a-n*. The power manager 116 may be coupled to a storage device (not shown) that stores the power consumption information obtained by the power manager 116. In some implementations, the power manager 116 may include the stored power consumption information into a power headroom report. In some implementations, the power manager 116 may send the power headroom report to another device (e.g., eNB) that determines allocation of uplink resources.

In some implementations, the power manager 116 may include other power consumption information associated with the UE 102. For example, the power manager 116 may include power consumption information relating to one or more of maximum UE power consumption, minimum UE power consumption, average UE power consumption and peak UE power consumption time. Additionally, the power manager 116 may include other power consumption information associated with the components 120*a-n*. Examples of power consumption information relating to the components 120*a-n* include maximum component power consumption, minimum component power consumption, average component power consumption and peak component power consumption time. For example, the power manager 116 may contain information indicating the maximum power consumption for an LCD component and information indicating the minimum power requirements of the LCD component. In some implementations, the power manager 116 may include this other power consumption information in the power headroom report.

In some examples, the power manager 116 may also determine the maximum uplink transmit power. The maximum uplink transmit power may reflect the amount of power (supplied from the battery 112, for instance) available for uplink transmission. For example, the maximum uplink transmit power may reflect the power available for LTE transmission via the transmit chain 104. In some implementations, the power manager 116 may determine the maximum uplink transmit power according to Equation (3).

As illustrated in Equation (3), the power available for uplink transmission may equal the power supplied by the battery 112 after accounting for component 120*a-n* consumption. In some implementations, the power manager 116 may include a constant value power margin identified in Equation (3) as $P_{margin}$, in determining the maximum uplink transmit power. In some implementations, the maximum uplink transmit power may be established by another computing device. For example, the other computing device (e.g., eNB) may set a limit on the transmit power available to the UE 102.

The power manager 116 may determine an actual uplink transmit power. In some implementations, the actual uplink transmit power reflects the power consumption during uplink transmission of data. For example, the actual uplink transmit power may be the power consumption during LTE transmission of data via the transmission chain 104. Given Equation (1) and Equation (3), the actual uplink transmit power may be limited by the maximum uplink transmit power, as illustrated in Equation (4).

The power manager 116 may also determine the estimated uplink transmit power. The estimated uplink transmit power may reflect the anticipated power consumption during uplink transmission of data. For example, the estimated uplink transmit power may be the estimated power consumption during LTE transmission of data via the transmission chain 104. The actual power may be approximately the same as the estimated power if the headroom is positive or less than the estimated power if the headroom is negative. For example, the estimated power may not be less than the actual power in either case.

In some implementations, the power manager 116 may determine the power headroom. As described above, power headroom may reflect the difference between the maximum uplink transmit power and the estimated uplink transmit power. In some implementations, the power manager 116 may determine the power headroom using Equation (2). If the power headroom is positive, the UE 102 may be capable of uplink transmission with sufficient power (based on the estimated uplink transmit power, for example). If the power headroom is negative, however, the UE 102 may still be capable of performing an uplink transmission, although at an insufficient power, which may degrade transmission quality. For instance, there may not be enough power supplied by the battery 112 to maintain transmission quality. As described herein, the UE 102 may accordingly reduce power consumption in this case.

In some implementations, the power manager 116 may determine whether the power headroom is less than a threshold. If the power headroom is greater than (e.g., greater than or equal to) the threshold, the UE 102 may perform an uplink transmission. If the power headroom is less than the threshold, the power manager 116 may direct one or more of the components 120*a-n* to reduce power consumption. As illustrated in Equation (3), as the component's 120*a-n* power consumption decreases, the maximum uplink transmit power may be increased.

If the power headroom is less than the threshold, the power manager 116 may direct the components 120*a-n* to reduce power consumption. For example, the power manager 116 may direct an LCD component to reduce power consumption. Reducing the power consumption of the LCD component, or any other component, may increase the maximum uplink transmit power. This may be beneficial as it may reduce the risk of a drop in the uplink transmission data rate and may prevent tear down of the air link due to insufficient power.

In some implementations, the power manager 116 may direct component A 120*a* to reduce power consumption such that the power reduction may equal or exceed the difference between the threshold and the power headroom. In other implementations, the power manager 116 may direct multiple components 120*a-n* to reduce respective power consumption such that the overall power reduction may equal or exceed the difference between the threshold and the power headroom. For example, the power manager 116 may direct an LCD component to reduce its power consumption by a minimum of half the difference and a CPU component to reduce its power consumption by a minimum of half the difference. Thus, in total, the UE power reduction may equal or exceed the difference.

In some implementations, the power manager 116 may direct one or more components 120a-n to reduce power consumption based on a schedule. For example, the power manager 116 may direct the one or more components 120a-n to reduce power consumption by a predetermined value, one at a time, until the UE 102 power reduction equals or exceeds the difference. In another example, the power manager 116 may direct the one or more components 120a-n to reduce power consumption in a predetermined order, one at a time, until the UE 102 power reduction equals or exceeds the difference. In another example, the schedule may be based on component 120a-n priority. For example, the power manager 116 may direct lower priority components 120a-n to reduce power consumption before directing higher priority components 120a-n to reduce power consumption According to some approaches, the power manager 116 may request a component 120a-n to reduce power consumption by the lesser of a maximum component power reduction and the difference between the threshold and the power headroom. This may be illustrated by Equation (6). In some implementations, the maximum component power reduction may be determined by the minimum power requirements of the component 120a-n. In other implementations, the maximum component power reduction may be determined by one or more of a predetermined setting, user input, UE manufacturer input and a percentage of current component power consumption.

If the component 120a-n reduces power consumption by the difference, then other components may maintain their power consumption. If the component 120a-n reduces power consumption by the maximum component power reduction, which may be less than the difference, one or more other components may reduce power consumption such that the total UE 102 power reduction may equal or exceed the difference.

In some implementations, the power manager 116 may communicate with a threshold module 114. The threshold module 114 may indicate a threshold to which the power headroom is compared. In some implementations, the threshold module 114 may determine the threshold based on input from another computing device (e.g., an eNB). For example, the other computing device (e.g., the eNB) may determine the threshold for uplink transmission based on the uplink resources available. In other implementations, the threshold module 114 may determine the threshold based on the UE 102. For example, the threshold module 114 may determine the threshold based on one or more of the number of components, the type of components, the battery and the type of UE 102. In some implementations, the threshold module 114 may determine the threshold based on the data to be transmitted. If the data packet to be transmitted is large, the threshold module 114 may establish a large threshold, whereas a smaller threshold may be used if the data packet is small. In some implementations, the threshold module 114 may be coupled to the power manager 116, as depicted in FIG. 1. In other implementations, the threshold module 114 may be included in the power manager 116.

The UE 102 may also include one or more components 120a-n. For example, a UE 102 may include one or more of a 3G cellular radio, 4G LTE cellular radio, a Wi-Fi radio, a WiMAX radio, Bluetooth, LCD and LCD backlights. In some implementations, each component 120a-n may receive a portion of the power supplied by the battery 112. This may be illustrated by Equation (1).

In some implementations, each component 120a-n may be coupled to a component controller 118a-n. In some implementations, a component controller 118a-n may control one or more aspects of a component 120a-n. For example, component controller A 118a may control the power consumption of component A 120a. In this example, component controller A 118a may control the power consumption of component A 120a in one or more ways. For example, an LCD controller may reduce power to an LCD component by reducing the backlight display power consumption. In another example, the LCD controller may reduce power to the LCD component by reducing the LCD refresh rate.

It should be noted that one or more of the elements or parts included in the UE 102 may be included in the UE operations module 110. For example, component A 120a may be included in the UE operations module 110. In another example, the transmit chain 104 may be included in the UE operations module 110.

It should be noted that one or more of the elements or parts thereof included in the UE 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
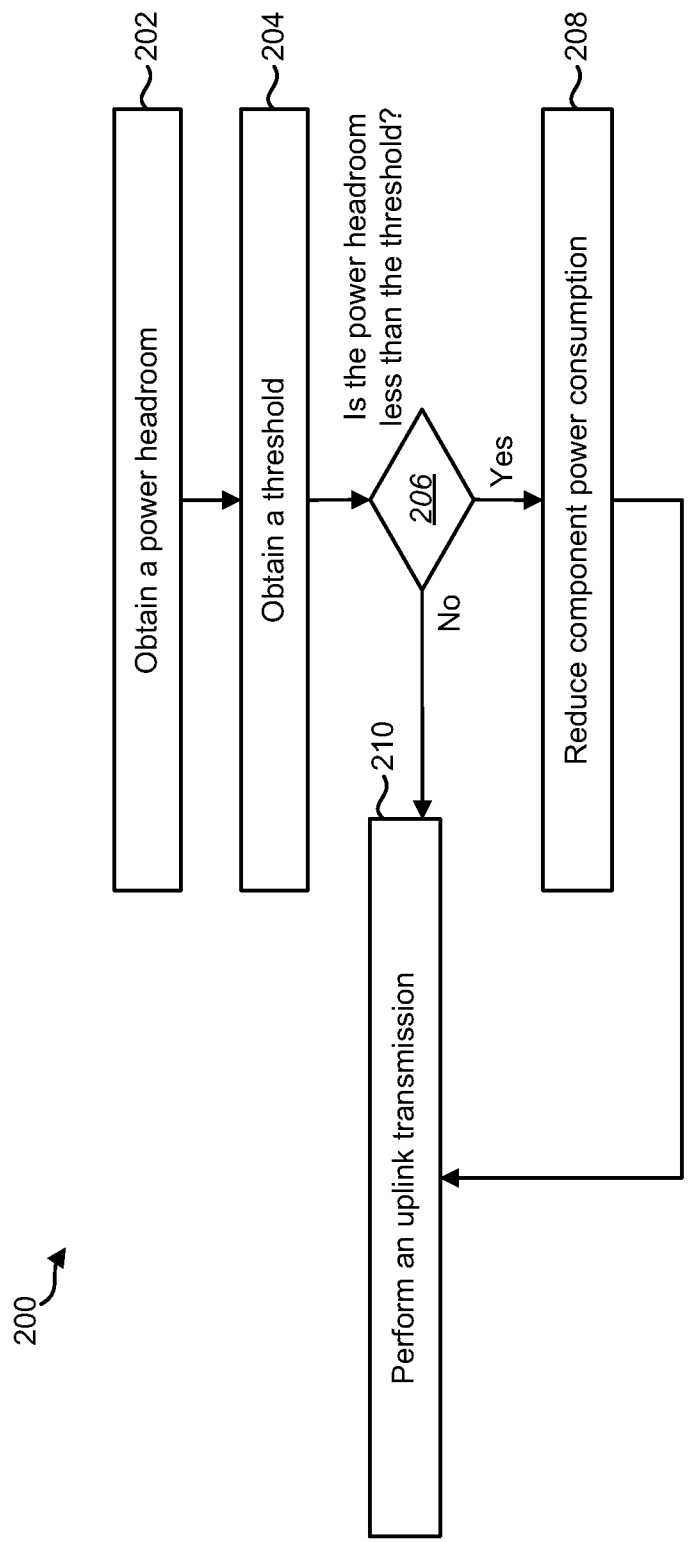
FIG. 2 is a flow diagram illustrating one configuration of a method for allocating power for uplink transmission.

FIG. 2 is a flow diagram illustrating one configuration of a method 200 for allocating power for uplink transmission. In some approaches, the UE 102 may obtain 202 a power headroom. As described above, the power headroom may reflect the difference between the maximum uplink transmit power and the estimated uplink transmit power. In other words, the power headroom indicates whether the UE 102 is capable of performing uplink transmission based on the current allocation of uplink resources. If the power headroom is positive, the UE 102 may be capable of uplink transmission with sufficient power (based on the estimated uplink transmit power, for example). If the power headroom is negative, however, the UE 102 may still be capable of performing an uplink transmission, although at an insufficient power, which may degrade transmission quality. For instance, there may not be enough power supplied by the battery 112 to maintain transmission quality. As described herein, the UE 102 may accordingly reduce power consumption in this case.

In some implementations, the UE 102 obtains 202 the power headroom from the power manager 116. For example, the power manager 116 may contain power consumption information relating to power consumption of the UE 102 and the components 120a-n. The power manager 116 may also include information relating to the power supplied by the battery 112. The power manager 116 may apply the UE power consumption information and information relating to the power supplied by the battery 112 to determine the maximum uplink transmit power. In some implementations, this may be done as illustrated in Equation (3). In some implementations, the power manager 116 may include a power margin in determining the maximum uplink transmit power. With the maximum uplink transmit power obtained, the power manager 116 may obtain information relating to the estimated uplink transmit power and may calculate the power headroom in accordance with Equation (2).

The UE 102 may obtain 204 a threshold. As described above, the threshold may be compared to the power headroom to determine if the UE 102 may perform an uplink transmission. In some implementations, the UE 102 may obtain 204 a threshold from the threshold module 114 included in the UE operations module 110. As described above, in some examples, the threshold module 114 may be included in the power manager 116.

In some implementations, the threshold may be based on the data to be transmitted. For example, if the data packet is large, the threshold module 114 may indicate a large threshold. In other implementations, the threshold may be based on the characteristics of the UE 102. For example, if the UE 102 includes many components 120a-n, a large threshold may be implemented. Other examples of threshold factors include, but are not limited to, input from the UE 102 user, input from the UE 102 manufacturer and input from another computing device (e.g., eNB). For example, the other computing device (e.g., eNB) may determine the threshold and send a message to the UE 102 indicating the threshold.

The UE 102 may determine 206 whether the power headroom is less than the threshold. In some implementations, the threshold module 114 may determine 206 whether the power headroom is less than the threshold. In this implementation, the threshold module 114 may receive the power headroom from the power manager 116 and may determine if it is less than the threshold. In another implementation, the power manager 116 may determine 206 whether the headroom is less than the threshold. In this implementation, the power manager 116 receives the threshold from the threshold module 114 and compares it to the power headroom.

If the power headroom is greater than (e.g., greater than or equal to) the threshold, the UE 102 may perform 210 an uplink transmission. For example, the UE 102 may perform 210 an uplink transmission based on (e.g., with) the estimated uplink transmit power. If the power headroom is less than the threshold, the UE 102 may reduce 208 one or more component 120a-n power consumption. For example, the power manager 116 of the UE 102 may direct the components 120a-n to reduce power consumption. In this implementation, the power manager 116 may direct one or more of the component controllers 118a-n to reduce the power consumption of one or more of the components 120a-n. For example, the power manager 116 may direct an LCD controller to reduce the power consumption of the LCD component. In this example, the component controller 118a-n may reduce the power consumption of the component 120a-n in one or more ways. For example, the LCD component controller may reduce the power consumption of the LCD component by one or more of reducing the LCD backlight power and reducing the LCD refresh rate.

In some implementations, the power manager 116 may reduce 208 one or more component based on UE power consumption information. For example, the power manager 116 may include information pertaining to an LCD component minimum power requirement. In this example, the power manager may direct the LCD component to reduce power consumption to the minimum power requirement. In this example, the power manager 116 may direct other components 120a-n to reduce power consumption.

In some implementations, the power manager 116 may direct more than one component 120a-n to reduce power consumption by a portion of the difference between the threshold and the power headroom. In this example, the aggregate power reduction of the more than one components 120a-n may equal or exceed the difference between the threshold and the power headroom. In some implementations, the power manager 116 may reduce the one or more component 120a-n power consumption based on a schedule. Upon reducing 208 component power consumption, the UE 102 may perform 210 an uplink transmission. For example, after reducing power consumption in one or more components 120a-n, the UE 102 may be able to allocate sufficient power to the uplink transmission. For instance, the UE 102 may perform 210 an uplink transmission based on the reduced component power consumption.

Figure 3:
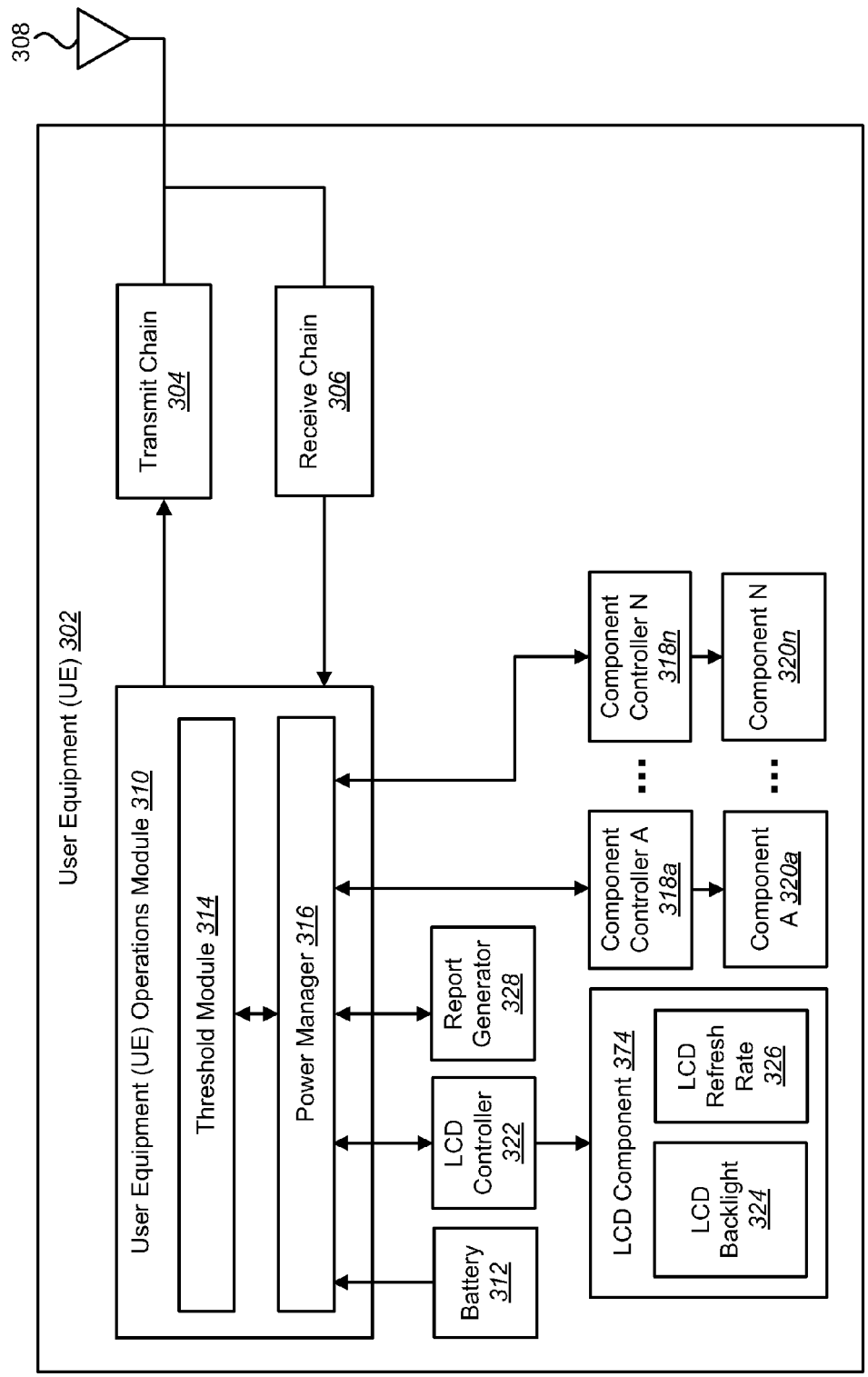
FIG. 3 is a block diagram illustrating another configuration of a UE in which systems and methods for allocating power for uplink transmission may be implemented.

FIG. 3 is a block diagram illustrating another configuration of a UE 302 in which systems and methods for allocating power for uplink transmission may be implemented. Examples of UEs 302 include cellular phones, smart phones, personal digital assistants (PDAs), laptop computers, netbooks, e-readers, wireless modems, etc.

The UE 302 may be similar to the UE 102 described previously in connection with FIG. 1. The UE 302 may include one or more of a UE operations module 310, a transmit chain 304, a receive chain 306, a battery 312 and one or more antennas 308 similar to corresponding elements described above in connection with FIG. 1. In some implementations, the UE operations module 310 may include one or more of a threshold module 314 and a power manager 316 similar to corresponding elements described in connection with FIG. 1. As used herein, the term "module" may indicate that a particular element or component may be implemented in hardware, software, firmware or a combination thereof. For example, the UE operations module 310 may be implemented in hardware (e.g., circuitry), software (e.g., instructions that are executable by a processor) or a combination of both.

The UE 302 may include an LCD controller 322. In some implementations, the LCD controller 322 may manage power consumption of an LCD component 374. The LCD component 374 may include one or more of an LCD backlight 324 and an LCD refresh rate 326. In some approaches, the LCD controller 322 may manage the one or more of the LCD backlight 324 and the LCD refresh rate 326. In some implementations, the LCD controller 322 receives power supplied from the battery 312 through the power manager 316. In this example, the power manager 316 may manage the power consumption of the LCD component 374 through the LCD controller 322 based on the power available to the UE 302 from the battery 312 and the power consumption of other components 320a-n. For example, the power manager 316 may distribute the power supplied from the battery 312 to the LCD component 374 and other components 320a-n (via respective component controllers 318a-n, for example) as illustrated in Equation (1).

In some implementations, the LCD controller 322 may receive a request from the power manager 316 to reduce the power consumption of the LCD component 374. In some examples, this request may be based on a determination that the power headroom is less than the threshold. In this example, the LCD controller 322 may reduce the power consumption of the LCD component 374. More particularly, in some approaches, the LCD controller 322 may reduce one or more of the LCD backlight 324 power consumption and the LCD refresh rate 326, which may reduce the LCD component 374 power consumption.

In some implementations, the request from the power manager 316 to reduce the power consumption of the LCD component 374 may be based on the maximum LCD power reduction. As described above, the maximum component power reduction may be based on one or more of the minimum LCD power requirement, a predetermined setting, user input, UE manufacturer input and a percentage of current LCD power consumption. In this implementation, the LCD controller 322 would reduce the power consumption of the LCD component 374 by this maximum LCD power reduction. More particularly, the LCD controller 322 may reduce one or more of the LCD backlight 324 power consumption and the LCD refresh rate 326 to reach the maximum LCD power reduction. If the maximum LCD power reduction is less than the reduction requested by the power manager 316, the power manager 316 may direct other components 320a-n to reduce power such that the power headroom may equal to or exceed the threshold.

In other implementations, the LCD controller 322 contains information pertaining to the maximum LCD power reduction of the LCD component 374. In this implementation, if the maximum LCD power reduction is less than the reduction requested by the power manager 316, the LCD controller 322 may send a message to the power manager 316 indicating that the maximum LCD power reduction has been achieved. In this example, the power manager 316 may direct other components 320a-n to reduce power such that the power headroom may be equal to or exceed the threshold.

In some implementations, the LCD controller 322 may reduce power to the LCD component 374 in one or more ways. For example, the LCD controller 322 may reduce the LCD backlight 324 power consumption. Because LCD backlights are among the most power-consuming components in the UE 302, reducing the LCD backlight 324 power consumption during uplink transmission may be beneficial as more power is made available for uplink transmission.

In some implementations, the LCD backlight 324 may have discrete power level settings. In some implementations, these discrete power level settings may manipulate the luminescence of the LCD backlight 324. In this example, the LCD controller 322 may reduce the LCD backlight 324 power consumption based on these discrete power level settings. In some examples, the discrete power level to which the LCD backlight 324 is reduced may be based on a request from the power manager 316.

In some implementations, the LCD controller 322 may reduce the LCD refresh rate 326. Because an LCD component 374 is among the most power-consuming components in the UE 302, reducing the LCD refresh rate 326 during uplink transmission may be beneficial as more power is made available for uplink transmission.

In some implementations, the LCD refresh rate 326 may have discrete power level settings. In this example, the LCD controller 322 may reduce the LCD refresh rate 326 based on these discrete power level settings. In some examples, the discrete power level to which the LCD refresh rate 326 is reduced may be based on a request from the power manager 316.

In some implementations, the LCD controller 322 may reduce the LCD backlight 324 power consumption and may reduce the LCD refresh rate 326 during uplink transmission. As described above, in some implementations, the reduction in the LCD backlight 324 power consumption and the reduction of the LCD refresh rate 326 may be based on a request from the power manager 316. In this example, the overall power reduction of the LCD component 374 may equal or exceed the reduction requested by the power manager 316 (e.g., the difference between the power headroom and the threshold).

The UE 302 may also include a report generator 328. In some implementations the report generator 328 generates a report that indicates the power headroom. As described above, the power headroom indicates the difference between the maximum uplink transmit power and the estimated uplink transmit power. Thus, the report generator 328 generates a report that indicates how much power the UE 302 is capable of generating on top of the estimated uplink transmit power. In some implementations, the report generator 328 may send the report to another computing device. For example, the report generator 328 may send the power headroom report to an eNB. In some implementations, the other computing device (e.g., the eNB) may allocate uplink resources based on the information contained in the power headroom report.

It should be noted that one or more of the elements or parts included in the UE 302 may be included in the UE operations module 310. For example, the receive chain 306 may be included in the UE operations module 310.

It should be noted that one or more of the elements or parts thereof included in the UE 302 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 4:
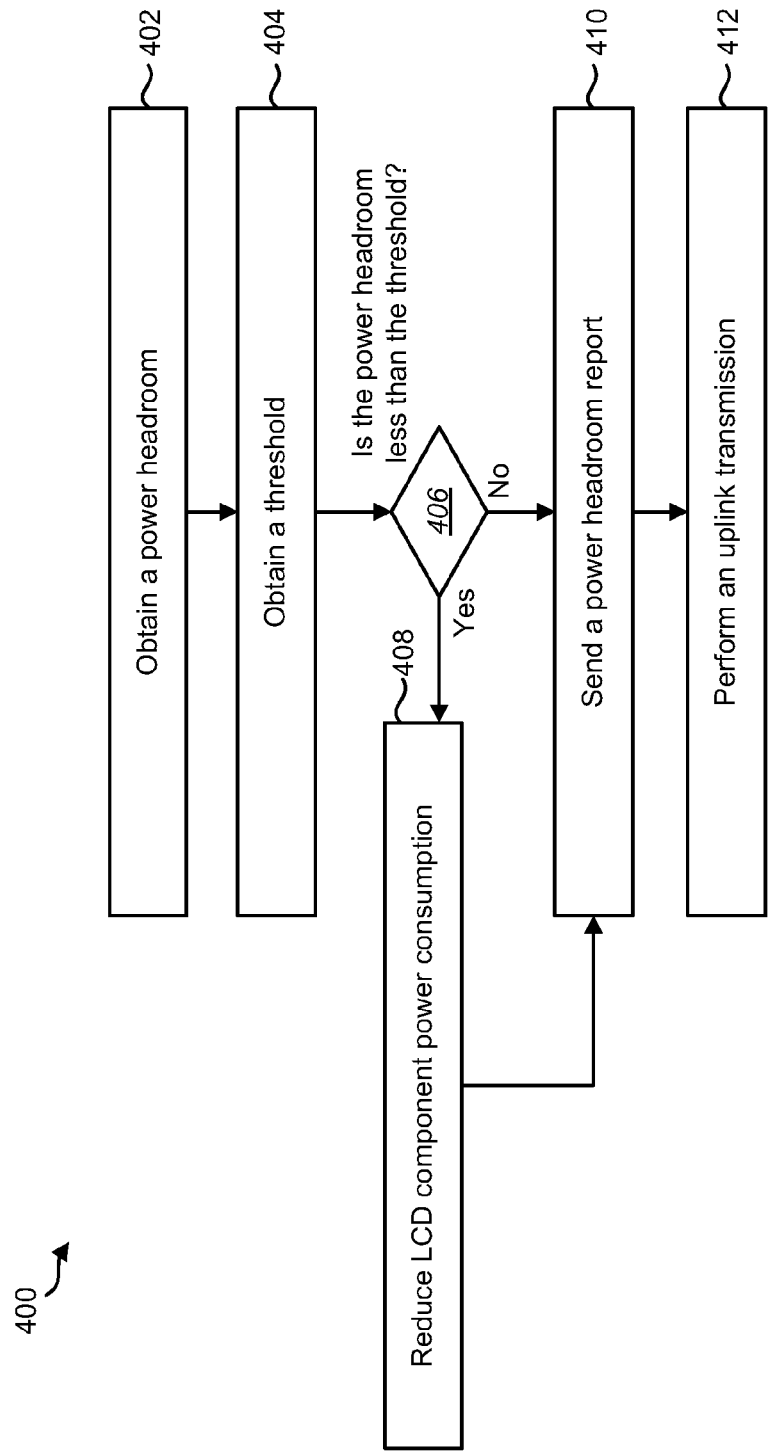
FIG. 4 is a flow diagram illustrating another configuration of a method for allocating power for uplink transmission.

FIG. 4 is a flow diagram illustrating another configuration of a method 400 for allocating power for uplink transmission. In some approaches, the UE 302 may obtain 402 a power headroom. For example, this may be done as described in connection with FIG. 2. The UE 302 may also obtain 404 a threshold. For example, this may be done as described in connection with FIG. 2. The UE 302 may determine 406 whether the power headroom is less than the threshold. For example, this may be done as described in connection with FIG. 2.

If the power headroom is greater than (e.g., greater than or equal to) the threshold, the UE 302 may send 410 a power headroom report. For example, the UE 302 may send 410 the power headroom report to another computing device (e.g., an eNB). In some configurations, the other computing device may allocate uplink resources based on the information contained in the power headroom report. The UE 302 may then perform 412 an uplink transmission. In some implementations, the UE 302 may perform 412 an uplink transmission based on (e.g., with) the estimated uplink transmit power.

In some implementations, the UE 302 may include an LCD component 374 and an LCD controller 322. In this implementation, the LCD component 374 may include one or more of an LCD backlight 324 and an LCD refresh rate 326. If the power headroom is less than the threshold, the UE 302 may reduce 408 the LCD component 374 power consumption.

According to one implementation, the power manager 316 of the UE 302 may direct the LCD controller 322 to reduce the power consumption of the LCD component 374. In this example, the power manager 316 may send a request to the LCD controller 322 to reduce power consumption of the LCD component 374. In some implementations, the request may be based on a difference between the power headroom and the threshold. More particularly, in an example, the power manager 316 may request that the LCD controller 322 reduce one or more of the LCD backlight 324 power consumption and the LCD refresh rate 326. In some implementations, the power manager 316 may request the LCD controller 322 to reduce power consumption of the LCD component 374 by the lesser of a maximum LCD power reduction and the difference between the power headroom and the threshold. As described above, the maximum LCD power reduction may be based on one or more of the minimum power requirements of the LCD component 374, user input, UE manufacturer input and a percentage of current LCD power consumption. If the maximum LCD power reduction is greater than the difference, the power manager 316 may reduce the power consumption of the LCD component 374 by the difference. For example, by reducing one or more of the LCD backlight 324 power consumption and LCD refresh rate 326. By comparison, if the maximum LCD power reduction is less than the difference, the power manager 316 may reduce the power consumption of the LCD component 374 by the maximum LCD power reduction. In this example, the power manager 316 may direct other components (e.g., a CPU component) to reduce power consumption such that the power headroom may be equal to or greater than the threshold.

In some implementations, the LCD power consumption information may be contained in the LCD controller 322. In this example, the power manager 316 may send a request to the LCD controller 322 to reduce the power consumption of the LCD component 374. In response, the LCD controller 322 may reduce the power consumption of the LCD component 374 by the lesser of the maximum LCD power reduction and the requested reduction (e.g., the difference between the power headroom and the threshold). If the maximum LCD power reduction is greater than the requested reduction, the LCD controller 322 may reduce the power consumption of the LCD component 374 by the requested reduction. By comparison, if the maximum LCD power reduction is less than the requested reduction, the LCD controller 322 may reduce the power consumption of the LCD component 374 by the maximum LCD power reduction. In some configurations, the LCD controller 322 may send a message to the power manager 316 indicating that LCD component 374 power consumption has been reduced by the maximum LCD power reduction amount. In this example, the power manager 316 may direct other components (e.g., a CPU component) to reduce power consumption such that the power headroom may be equal to or greater than the threshold.

After the UE 302 has reduced 408 LCD component power consumption, the UE 302 may send 410 a power headroom report. In some implementations, this may be done as described previously. The UE 302 may then perform 412 an uplink transmission. For example, the reduced LCD component power consumption may enable the UE 302 to perform 412 an uplink transmission with sufficient power. In some implementations, this may be done as described in connection with FIG. 2.

Figure 5:
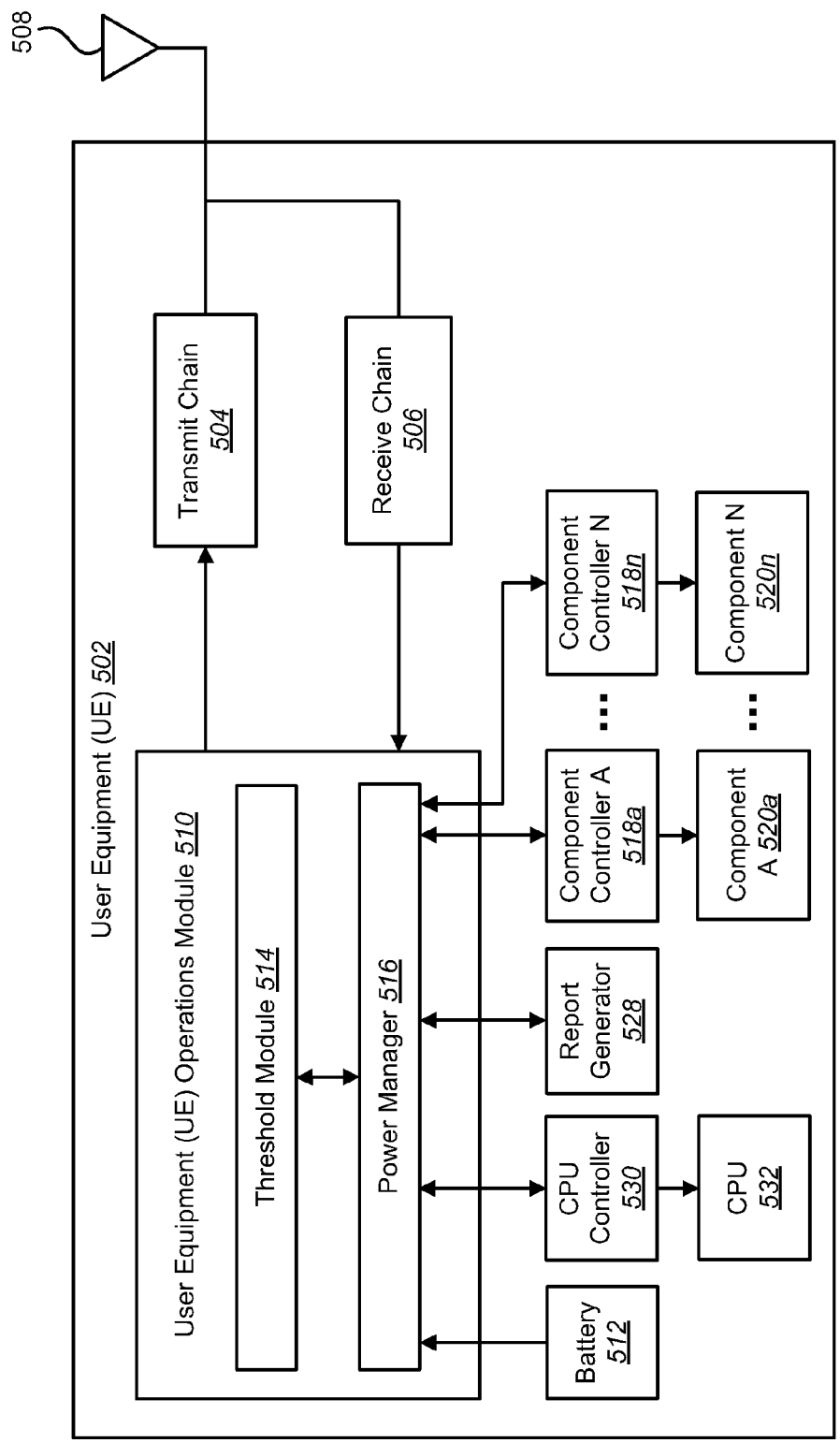
FIG. 5 is a block diagram illustrating another configuration of a UE in which systems and methods for allocating power for uplink transmission may be implemented.

FIG. 5 is a block diagram illustrating another configuration of a UE 502 in which systems and methods for allocating power for uplink transmission may be implemented. The UE 502 may be similar to the UE 102 and the UE 302 described previously in connection with FIG. 1 and FIG. 3, respectively. The UE 502 may include one or more of a UE operations module 510, a transmit chain 504, a receive chain 506, a battery 512 and one or more antennas 508 similar to corresponding elements described above in connection with FIG. 1. In some implementations, the UE operations module 510 may include one or more of a threshold module 514 and a power manager 516 similar to corresponding elements described in connection with FIG. 1. The UE 502 may also include a report generator 528 similar to the report generator 328 described in connection with FIG. 3.

In some approaches, the UE 502 may include a CPU controller 530. In some implementations, the CPU controller 530 may manage the power consumption of a CPU component 532. In some approaches, the CPU controller 530 receives power supplied from the battery 512 through the power manager 516. In this example, the power manager 516 may manage the power consumption of the CPU component 532 through the CPU controller 530 based on the power available to the UE 502 from the battery 512 and the power consumption of other components 520a-n. For example, the power manager 516 may distribute the power supplied from the battery 512 to the CPU component 532 and other components 520a-n (via respective component controllers 518a-n, for example) based on Equation (1).

In some implementations, the CPU controller 530 may receive a request from the power manager 516 to reduce the power consumption of the CPU component 532. In some examples, this request may be based on a determination that the power headroom is less than the threshold. In this example, the CPU controller 530 would reduce the power consumption of the CPU component 532. For example, the CPU controller 530 may reduce one or more of the frequency and voltage supplied to the CPU component 532. As described in Equation (7), a reduction in one or more of the frequency and voltage supplied to the CPU component 532, may reduce the CPU component 532 power consumption.

In some approaches, the request from the power manager 516 to reduce the power consumption of the CPU component 532 may be based on the maximum CPU power reduction. As described above, the maximum CPU power reduction may be based on one or more of the minimum CPU power requirements, a predetermined setting, user input, UE manufacturer input and a percentage of current CPU power consumption. In this implementation the CPU controller 530 would reduce the power consumption of the CPU component 532 by this maximum CPU power reduction. More particularly, the CPU controller 530 may reduce one or more of the frequency and voltage supplied to the CPU component 532 to reach the maximum CPU power reduction. If the maximum CPU power reduction is less than the difference, the power manager 516 may direct other components 520a-n to reduce power such that the power headroom may be equal to or greater than the threshold.

In other implementations, the CPU controller 530 contains information pertaining to a maximum CPU power reduction of the CPU component 532. In this implementation, if the maximum CPU power reduction is less than the reduction requested by the power manager 516, the CPU controller 530 may send a message to the power manager 516 indicating that the power consumption of the CPU component 532 has been reduced by the maximum CPU power reduction. In this example, the power manager 516 may direct other components 520a-n to reduce power such that the power headroom may be equal to or greater than the threshold.

It should be noted that one or more of the elements or parts illustrated as separate from the UE operations module 510 may be alternatively included in the UE operations module 510 in some configurations. For example, the CPU controller 530 may be included in the UE operations module 510.

It should be noted that one or more of the elements or parts thereof included in the UE 502 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 6:
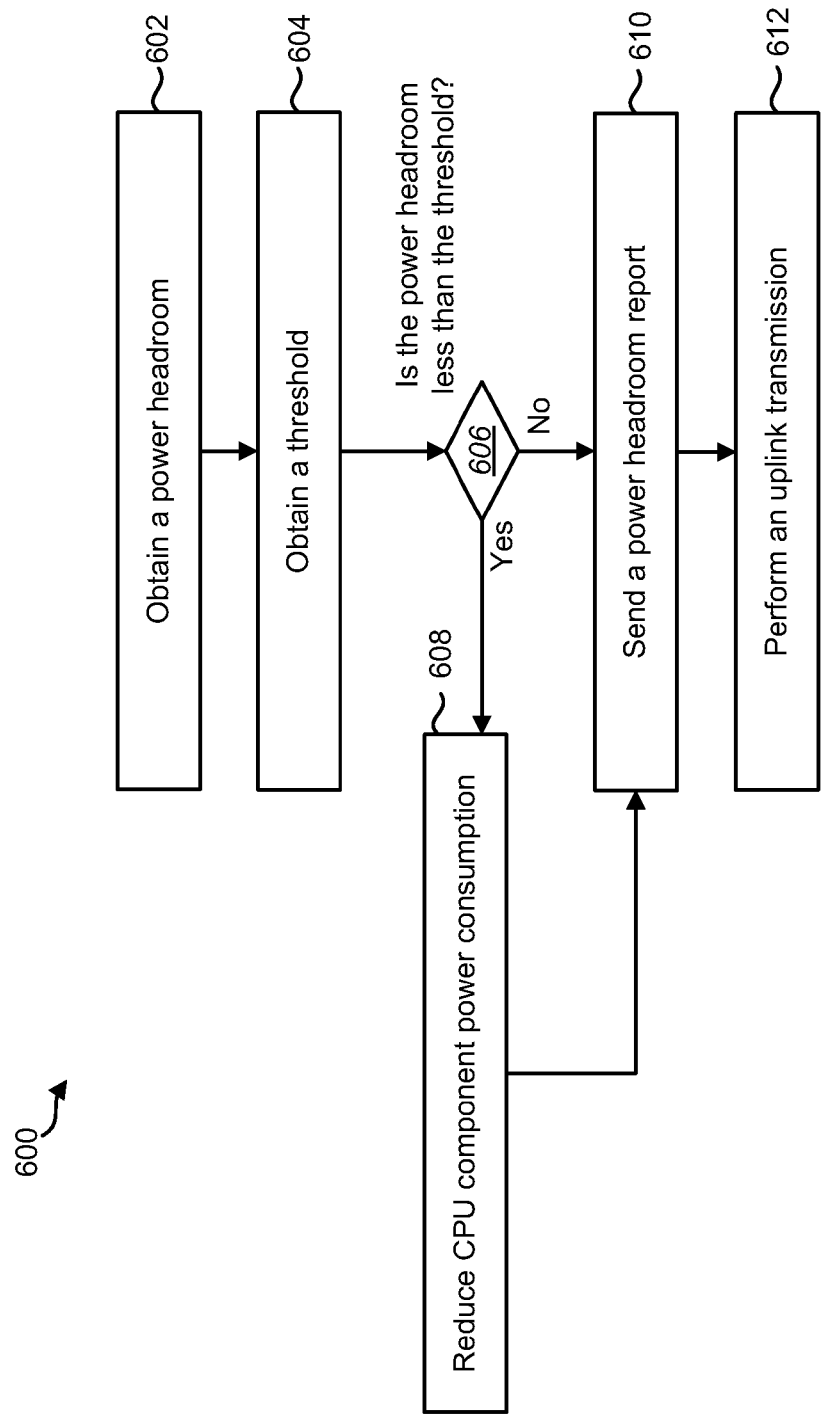
FIG. 6 is a flow diagram illustrating another configuration of a method for allocating power for uplink transmission.

FIG. 6 is a flow diagram illustrating another configuration of a method 600 for allocating power for uplink transmission. In some approaches, the UE 502 may obtain 602 a power headroom. For example, this may be done as described in connection with FIG. 2. The UE 502 may also obtain 604 a threshold. For example, this may be done as described in connection with FIG. 2. The UE 502 may determine 606 whether the power headroom is less than the threshold. For example, this may be done as described in connection with FIG. 2.

If the power headroom is greater than (e.g., greater than or equal to) the threshold, the UE 502 may send 610 a power headroom report. For example, this may be done as described in connection with FIG. 4. The UE 502 may perform 612 an uplink transmission. In some implementations, the UE 502 may perform 612 an uplink transmission based on (e.g., with) the estimated uplink transmit power.

As described above, in some implementations, the UE 502 may include a CPU component 532 and a CPU controller 530. In this implementation, if the power headroom is less than the threshold, the UE 502 may reduce 608 CPU component 532 power consumption. According to one implementation, the power manager 516 of the UE 502 may direct the CPU controller 530 to reduce the power consumption of the CPU component 532. More particularly, in an example, the power manager 516 may request that the CPU controller 530 reduce one or more of the frequency and voltage supplied to the CPU component 532. In some implementations, the power manager 516 may request the CPU controller 530 to reduce the power consumption of the CPU component 532 by the lesser of a maximum CPU power reduction and the difference between the power headroom and the threshold. As described above, the maximum CPU power reduction may be based on one or more of the minimum power requirements of the CPU component 532, user input, UE manufacturer input and a percentage of current CPU power consumption. If the maximum CPU power reduction is greater than the difference, the power manager 516 may reduce the power consumption of the CPU component 532 by the difference. For example, by reducing one or more of the frequency and voltage supplied to the CPU component 532. By comparison, if the maximum CPU power reduction is less than the difference, the power manager 516 may reduce the power consumption of the CPU component 532 by the maximum CPU power reduction. In this example, the power manager 516 may direct other components (e.g., an LCD component) to reduce power consumption such that the power headroom may be equal to or greater than the threshold.

In some implementations, the CPU power consumption information may be contained in the CPU controller 530. In this example, the power manager 516 may send a request to the CPU controller 530 to reduce the power consumption of the CPU component 532. In response, the CPU controller 530 may reduce the power consumption of the CPU component 532 by the lesser of the maximum CPU power reduction and the requested reduction (e.g., the difference between the power headroom and the threshold). If the maximum CPU power reduction is greater than the requested reduction, the CPU controller 530 may reduce the power consumption of the CPU component 532 by the requested reduction. By comparison, if the maximum CPU power reduction is less than the requested reduction, the CPU controller 530 may reduce the power consumption of the CPU component 532 by the maximum CPU power reduction. The CPU controller 530 may send a message to the power manager 516 indicating that CPU component 532 power consumption has been reduced by the maximum CPU power reduction. In this example, the power manager 516 may direct other components (e.g., a LCD component) to reduce power consumption such that the power headroom may be equal to or greater than the threshold.

After the UE 502 has reduced 608 CPU component power consumption, the UE 502 may send 610 a power headroom report. In some implementations, this may be done as described previously. The UE 502 may then perform 612 an uplink transmission. For example, the reduced CPU component power consumption may enable the UE 502 to perform 612 an uplink transmission with sufficient power. In some implementations, this may be done as described in connection with FIG. 2.

Figure 7:
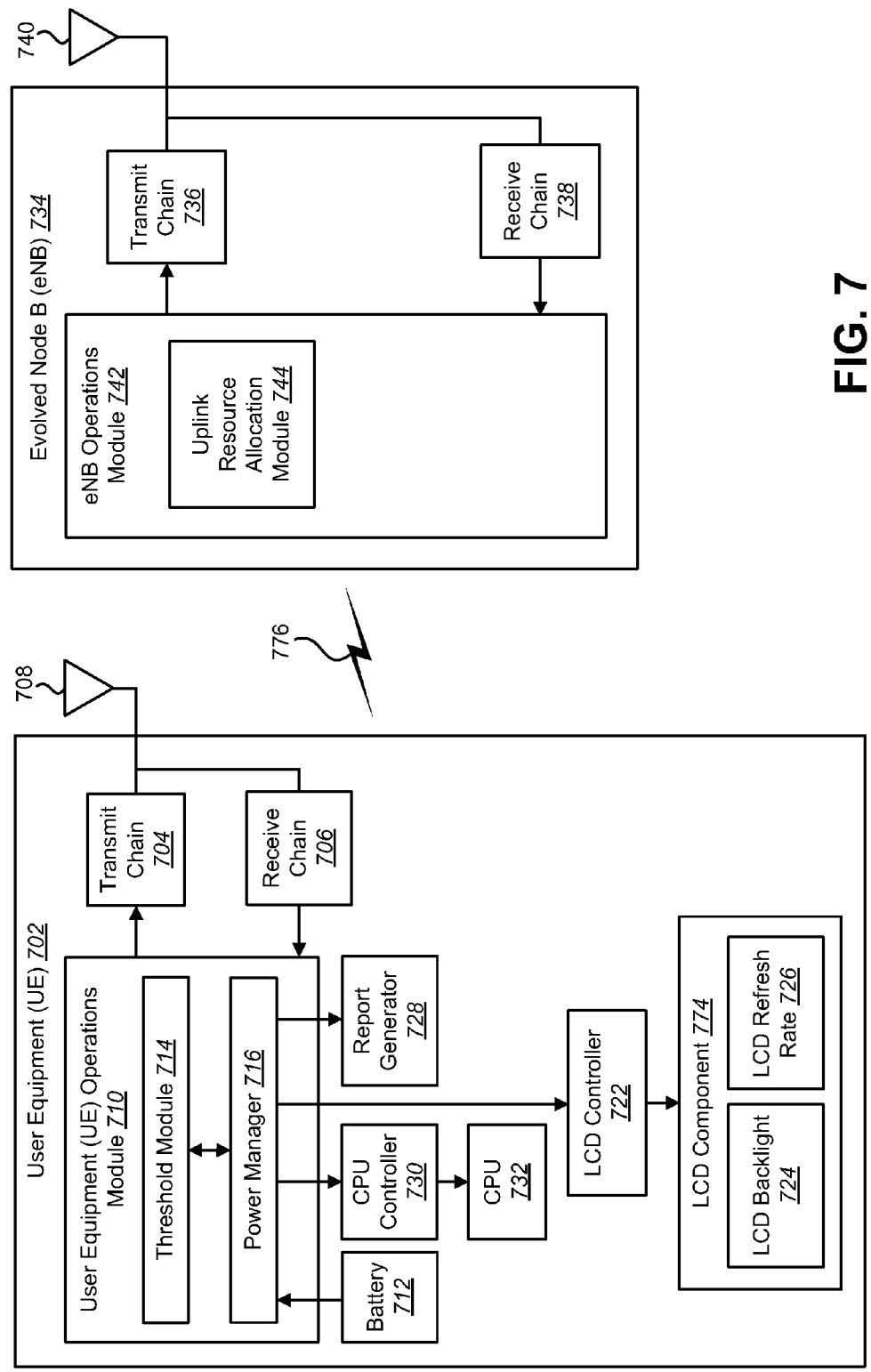
FIG. 7 is a block diagram illustrating a configuration of a UE and an evolved Node B (eNB) in which systems and methods for allocating power for uplink transmission may be implemented.

FIG. 7 is a block diagram illustrating another configuration of a UE 702 and an eNB 734 in which systems and methods for allocating power for uplink transmission may be implemented. The UE 702 may be similar to one or more of the UE 102, UE 302 and UE 502 described previously in connection with FIG. 1, FIG. 3 and FIG. 5, respectively. The UE 702 may include one or more of a UE operations module 710, a transmit chain 704, a receive chain 706, a battery 712 and one or more antennas 708 similar to corresponding elements described in connection with FIG. 1. In some implementations, the UE operations module 710 may include one or more of a threshold module 714 and a power manager 716 similar to corresponding elements described in connection with FIG. 1. The UE 702 may also include a report generator 728, an LCD component 774, including an LCD backlight 724 and an LCD refresh rate 726, an LCD controller 722, similar to corresponding elements described in connection with FIG. 3. The UE 702 may also include a CPU controller 730 and a CPU component 732 similar to corresponding elements described in connection with FIG. 5.

The UE 702 may communicate with an eNB 734. The eNB may include one or more of an eNB operations module 742, a transmit chain 736, a receive chain 738 and one or more antennas 740 similar to the UE operations module 102, transmit chain 104, receive chain 106 and one or more antennas 108 described in connection with FIG. 1.

The eNB may communicate with the UE 702 via a link 776. According to some implementations, the link 776 may be established via a network. Examples of networks include personal area networks, local area networks (LAN), wide area networks (WAN), terrestrial cellular networks, satellite networks and any other type of network.

In some implementations, the eNB operations module 742 may include an uplink resource allocation module 744. The uplink resource allocation module 744 may allocate resources of the eNB 734 to allow one or more uplink transmissions. In particular, the uplink resource allocation module 744 may allocate resources to the UE 702 for an uplink transmission. For instance, the uplink resource allocation module 744 may include control information that indicates a schedule for transmitting data on an uplink transmission. The uplink resource allocation module 744 may also schedule sub-carriers for uplink transmission. Other example of uplink resources that are allocated include data rate and transmit power.

It should be noted that one or more of the elements or parts illustrated as separate from the UE operations module 710 may be alternatively included in the UE operations module 710 in some configurations. For example, the CPU controller 730 may be included in the UE operations module 710.

It should be noted that one or more of the elements or parts thereof included in the UE 702 and the eNB 734 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 8:
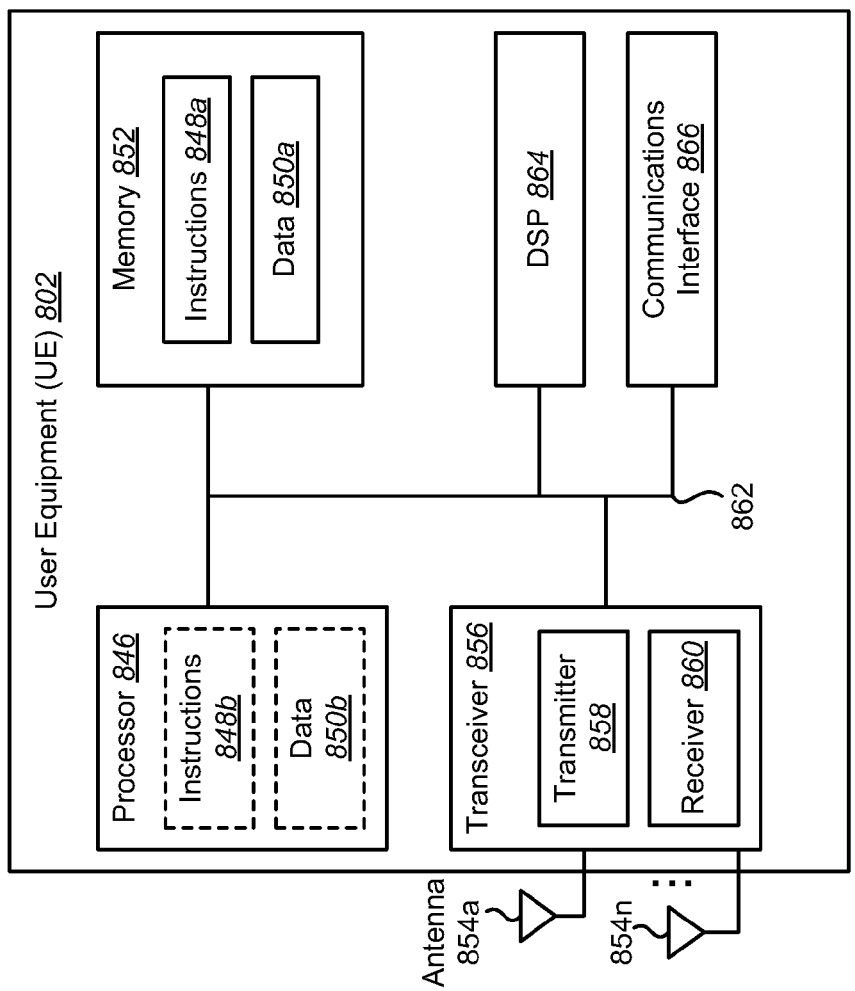
FIG. 8 illustrates various components that may be utilized in a UE.

FIG. 8 illustrates various components that may be utilized in a UE 802. The UE 802 described in connection with FIG. 8 may be implemented in accordance with One or more of the UEs 102, 302, 502 and 702 described above. The UE 802 includes a processor 846 that controls operation of the UE 802. The processor 846 may also be referred to as a central processing unit (CPU). Memory 852, which may include read-only memory (ROM), random access memory (RAM), a combination of the two or any type of device that may store information, provides instructions 848a and data 850a to the processor 846. A portion of the memory 852 may also include non-volatile random access memory (NVRAM). Instructions 848b and data 850b may also reside in the processor 846. Instructions 848b and/or data 850b loaded into the processor 846 may also include instructions 848a and/or data 850a from memory 852 that are loaded for execution or processing by the processor 846. The instructions 848b may be executed by the processor 846 to implement one or more of the methods 200, 400, 600 and approaches described above.

The UE 802 may also include a housing that contains one or more transmitters 858 and one or more receivers 860 to allow transmission and reception of data. The transmitter(s) 858 and receiver(s) 860 may be combined into one or more transceivers 856. One or more antennas 854a-n are attached to the housing and electrically coupled to the transceiver 856.

The various components of the UE 802 are coupled together by a bus system 862, which may include a power bus, a control signal bus and a status signal bus, in addition to a data bus. However, for the sake of clarity, the various buses are illustrated in FIG. 8 as the bus system 862. The UE 802 may also include a digital signal processor (DSP) 864 for use in processing signals. The UE 802 may also include a communications interface 866 that provides user access to the functions of the UE 802. The UE 802 illustrated in FIG. 8 is a functional block diagram rather than a listing of specific components.

Figure 9:
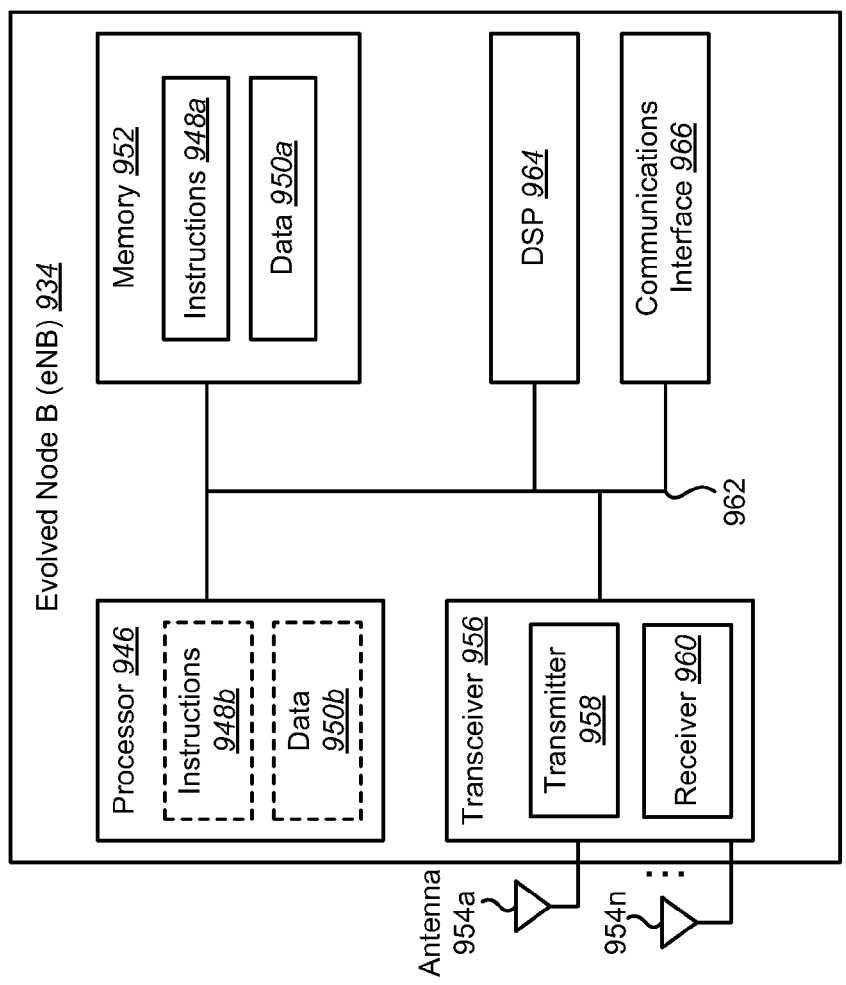
FIG. 9 illustrates various components that may be utilized in an eNB.

FIG. 9 illustrates various components that may be utilized in an eNB 934. The eNB 934 described in connection with FIG. 9 may be implemented in accordance with the eNB 734 described in connection with FIG. 7. The eNB 934 includes a processor 946 that controls operation of the eNB 934. The processor 946 may also be referred to as a central processing unit (CPU). Memory 952, which may include read-only memory (ROM), random access memory (RAM), a combination of the two or any type of device that may store information, provides instructions 948a and data 950a to the processor 946. A portion of the memory 952 may also include non-volatile random access memory (NVRAM). Instructions 948b and data 950b may also reside in the processor 946. Instructions 948b and/or data 950b loaded into the processor 946 may also include instructions 948a and/or data 950a from memory 952 that are loaded for execution or processing by the processor 946. The instructions 948b may be executed by the processor 946 to implement one or more of the functions described in connection with an eNB (e.g., eNB 734).

The eNB 934 may also include a housing that contains one or more transmitters 958 and one or more receivers 960 to allow transmission and reception of data. The transmitter(s) 958 and receiver(s) 960 may be combined into one or more transceivers 956. One or more antennas 954a-n are attached to the housing and electrically coupled to the transceiver 956.

The various components of the eNB 934 are coupled together by a bus system 962, which may include a power bus, a control signal bus and a status signal bus, in addition to a data bus. However, for the sake of clarity, the various buses are illustrated in FIG. 9 as the bus system 962. The eNB 934 may also include a digital signal processor (DSP) 964 for use in processing signals. The eNB 934 may also include a communications interface 966 that provides user access to the functions of the eNB 934. The eNB 934 illustrated in FIG. 9 is a functional block diagram rather than a listing of specific components.

Figure 10:
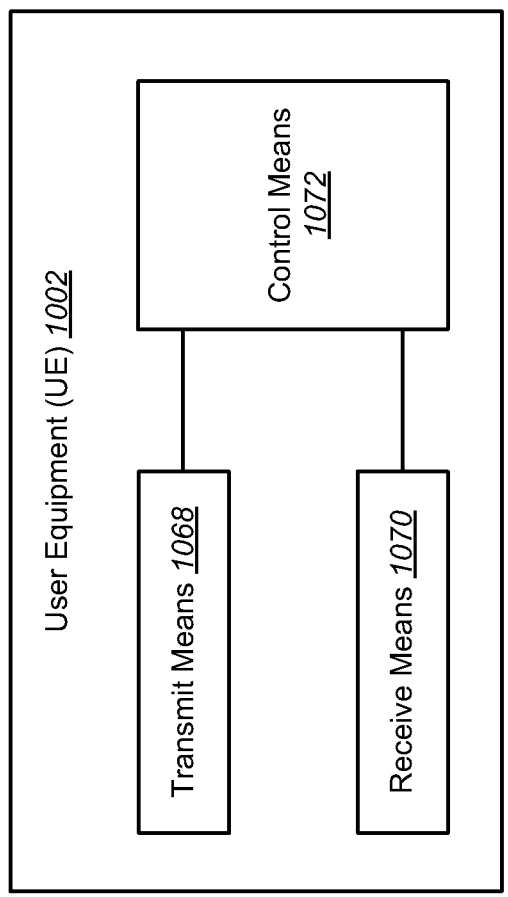
FIG. 10 is a block diagram illustrating one configuration of a UE in which systems and methods for allocating power for uplink transmission may be implemented.

FIG. 10 is a block diagram illustrating one configuration of a UE 1002 in which systems and methods for allocating power for uplink transmission may be implemented. The UE 1002 includes transmit means 1068, receive means 1070 and control means 1072. The transmit means 1068, receive means 1070 and control means 1072 may be configured to perform one or more of the functions described in connection with FIGS. 2, 4 and 6. FIG. 8 above illustrates one example of a concrete apparatus structure of FIG. 10. Other various structures may be implemented to realize one or more of the functions of FIGS. 2, 4 and 6. For example, a DSP may be realized by software.

Figure 11:
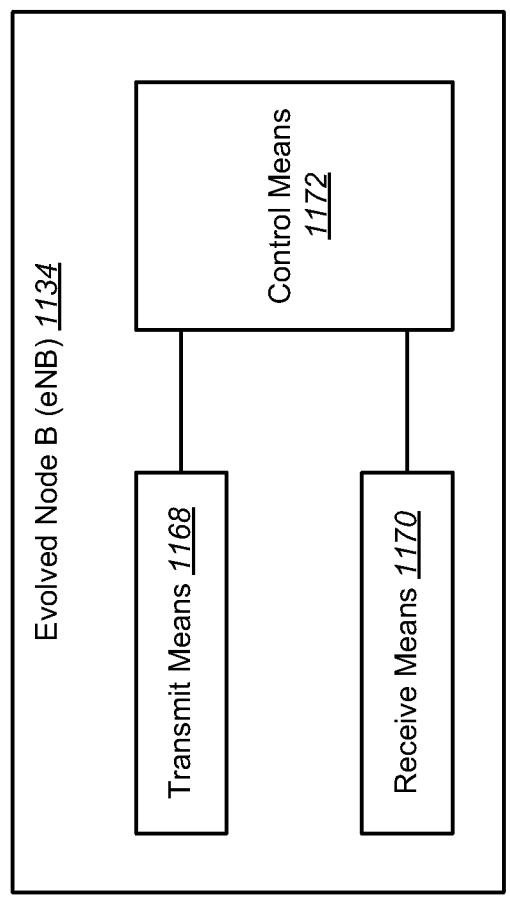
FIG. 11 is a block diagram illustrating one configuration of an eNB in which systems and methods for allocating power for uplink transmission may be implemented.

FIG. 11 is a block diagram illustrating one configuration of an eNB 1134 in which systems and methods for allocating power for uplink transmission may be implemented. The eNB 1134 includes transmit means 1168, receive means 1170 and control means 1172. The transmit means 1168, receive means 1170 and control means 1172 may be configured to perform one or more of the functions described in connection with an eNB (e.g., eNB 734). FIG. 9 above illustrates one example of a concrete apparatus structure of FIG. 11. Other various structures may be implemented to realize one or more of the functions of FIGS. 2, 4 and 6. For example, a DSP may be realized by software.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

As used herein, the term "coupled" and other variations thereof may mean that one element is connected to another element directly or indirectly. For example, if a first element is coupled to a second element, the first element may be connected directly to the second element or may be connected to the second element through another element.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A User Equipment (UE) for allocating power for uplink transmission to an evolved Node B (eNB), comprising:
a processor;
memory in electronic communication with the processor, wherein instructions stored in the memory are executable to:
obtain a power headroom, wherein the power headroom is based on a difference between a maximum uplink transmit power and an estimated uplink transmit power;
obtain a threshold; and
reduce power consumption if the power headroom is less than the threshold.

2. The UE of claim 1, wherein reducing power consumption comprises reducing power consumption of at least one component.

3. The UE of claim 2, wherein the component is a liquid crystal display (LCD).

4. The UE of claim 2, wherein the component is a central processing unit (CPU).

5. The UE of claim 1, wherein the instructions are further executable to perform an uplink transmission based on the estimated uplink transmit power if the power headroom is greater than the threshold.

6. The UE of claim 1, wherein reducing power consumption is based on a difference between the power headroom and the threshold.

7. The UE of claim 1, wherein reducing power consumption is based on discrete power consumption levels.

8. The UE of claim 1, wherein the estimated uplink transmit power is based on an uplink resource.

9. The UE of claim 1, wherein the maximum uplink transmit power is based on a component power consumption.

10. The UE of claim 1, wherein the instructions are further executable to send a power headroom report.

11. A method for allocating power by a UE for uplink transmission to an evolved Node B (eNB), comprising:
obtaining a power headroom, wherein the power headroom is based on a difference between a maximum uplink transmit power and an estimated uplink transmit power;
obtaining a threshold; and
reducing power consumption if the power headroom is less than the threshold.

12. The method of claim 11, wherein reducing power consumption comprises reducing power consumption of at least one component.

13. The method of claim 12, wherein the component is a liquid crystal display (LCD).

14. The method of claim 12, wherein the component is a central processing unit (CPU).

15. The method of claim 11, further comprising performing an uplink transmission based on the estimated uplink transmit power if the power headroom is greater than the threshold.

16. The method of claim 11, wherein reducing power consumption is based on a difference between the power headroom and the threshold.

17. The method of claim 11, wherein reducing power consumption is based on discrete power consumption levels.

18. The method of claim 11, wherein the estimated uplink transmit power is based on an uplink resource.

19. The method of claim 11, wherein the maximum uplink transmit power is based on a component power consumption.

20. The method of claim 11, further comprising sending a power headroom report.

* * * * *